R. A. FESSENDEN.
METHOD AND APPARATUS FOR COOLING AND LUBRICATING SYSTEMS.
APPLICATION FILED AUG. 9, 1917.
1,331,907.
Patented Feb. 24, 1920.
3 SHEETS—SHEET 1.
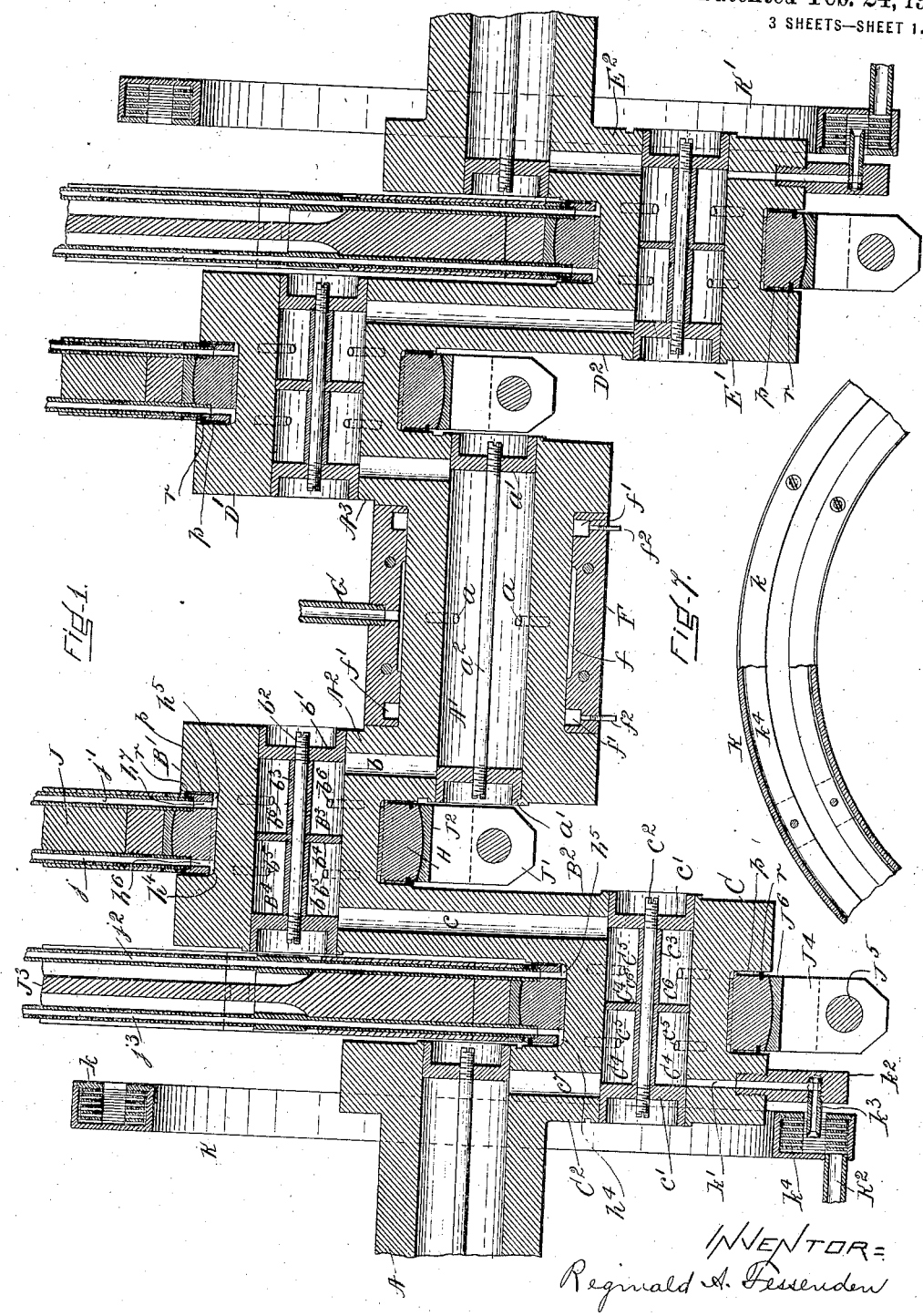

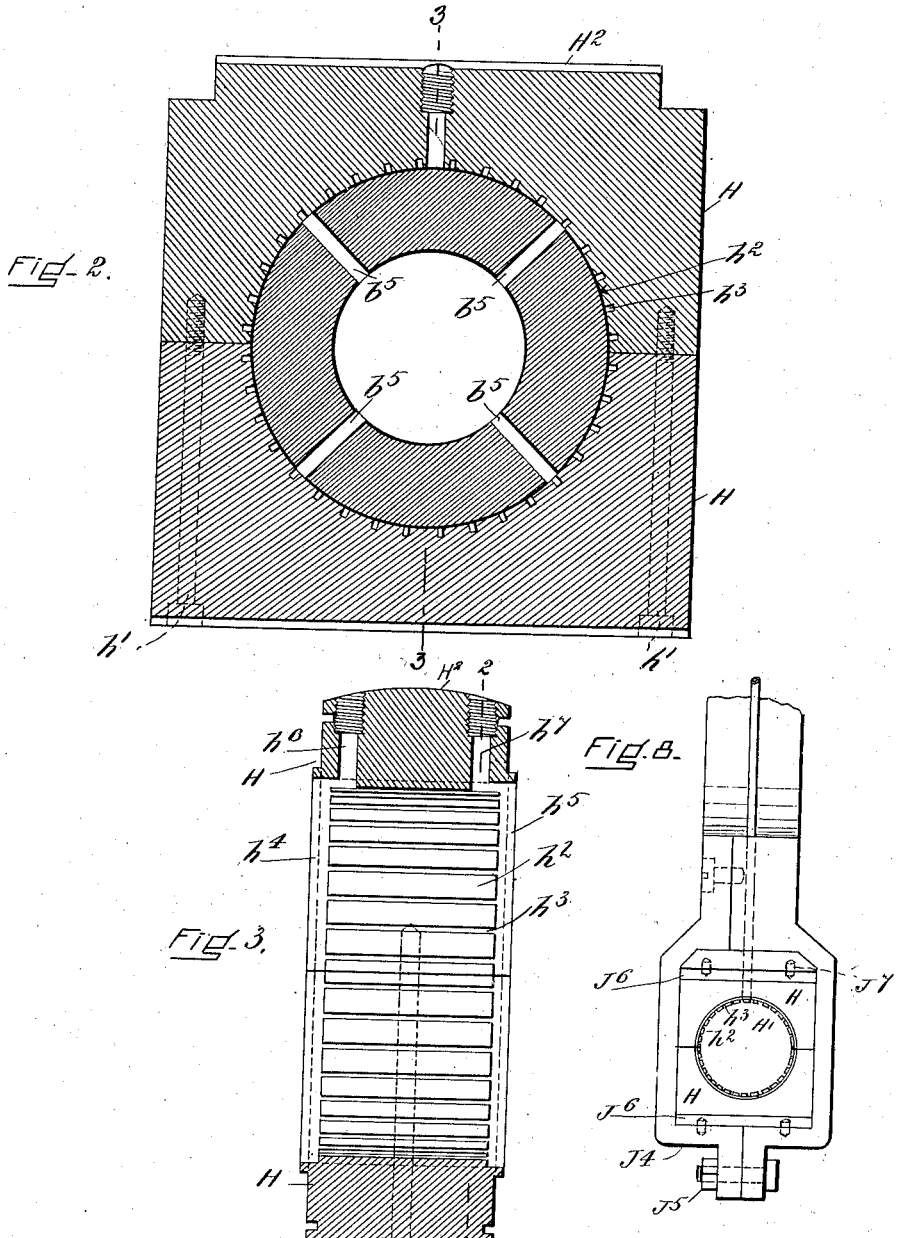

R. A. FESSENDEN.
METHOD AND APPARATUS FOR COOLING AND LUBRICATING SYSTEMS.
APPLICATION FILED AUG. 9, 1917.

1,331,907.

Patented Feb. 24, 1920
3 SHEETS—SHEET 3.

INVENTOR:
Reginald A. Fessenden
BY
HIS ATTORNEYS:

UNITED STATES PATENT OFFICE.

REGINALD A. FESSENDEN, OF BROOKLINE, MASSACHUSETTS.

METHOD AND APPARATUS FOR COOLING AND LUBRICATING SYSTEMS.

1,331,907.

Specification of Letters Patent.    Patented Feb. 24, 1920.

Application filed August 9, 1917. Serial No. 185,395.

*To all whom it may concern:*

Be it known that I, REGINALD A. FESSENDEN, of Brookline, in the county of Norfolk, and State of Massachusetts, a citizen of the United States, have invented certain new and useful Improvements in Methods and Apparatus for Cooling and Lubricating Systems, of which the following is a specification.
My invention relates to the lubrication and cooling of bearings for shafts, and it is especially adapted to crank shafts and the crank arms carried and operated thereby, though it may have other uses.
Heretofore even in the best lubricated bearings the greater part of the frictional heat has been carried off by transmission from the oil film to the metal of the bearing and thence to the air and the amount of heat which could be carried off has depended upon the co-efficient of thermal contact resistance between the oil and the metal of the bearing which thermal contact resistance is quite high and analogous to the electrical contact resistance between two metals. Consequently only a certain amount of friction could be allowed per square inch of surface, above which amount the bearings would seize.
Under my system the greater part and substantially all of the heat generated by friction remains in the oil and is carried off by the oil from the bearing to an outside cooling arrangement where the heat is removed from the oil.

Under this system the amount of friction per square inch is not limited as in the bearings at present in use and pressures of 10,000 pounds per square inch and speeds of a mile a minute have been tried and found to operate successfully, the bearings remaining quite cool. One method of accomplishing this is, instead of allowing the oil to be carried around and around in the bearings until it gradually leaks out or is forced out at one end, to provide channels along the bearing so that the oil entering one end of one channel is carried across a narrow strip of the bearing, there performing its work of lubrication and becoming heated, and then being carried over into the next adjacent longitudinal channel and is carried from thence out of the bearing, still retaining practically all the frictional heat in it and is transferred from thence by a system of pipes to a cooling chamber.

And second, among other important features of my invention, is that I prefer to maintain the pressure of the oil at a negative value with reference to the point at which it leaves the crank sysem, so that if there is any leakage due to faulty packing air will tend to leak in instead of oil leaking out.
During its progress through my circulating system while it is out of contact with the bearings or other moving parts which it has lubricated, it may be temporarily stored in a tank, open to the atmosphere, or it may be otherwise reduced to a temperature below that at which it has been delivered from the bearings, for example, by coils containing a cooling fluid in the tank, or by passing it through coils exposed to a chilling medium.
In the drawings hereto I have not shown the pump, tank, or coils, as they are well known as a liquid circulating means.

My invention will be understood by reference to the drawings, in which—
Figure 1 is a longitudinal section of two double cranks arranged more particularly for use in the engine described by me in United States Patent No. 1,132,465.

Fig. 2 is a section on line 2—2 of Fig. 3, showing a box or bearing for a crank arm and also the crank pin.

Fig. 3 is a section on line 3—3 of Fig. 2, the crank pin being omitted.

Fig. 7 is a fragment partly in section of the oil-collecting ring.

Fig. 8 is a detail of the connecting rod connection.

A is the shaft proper carrying double cranks B, C, D and E, the number of cranks as usual depending upon the work to be done. The shaft is hollow, and the crank pins $B^1$, $C^1$, $D^1$ and $E^1$ are also hollow, as below described, and the crank arms $A^2$, $A^3$, $B^2$, $C^2$, $D^2$ and $E^2$ have passages through them connecting the passage in the shaft with the passages in the crank pins as below described. This hollow construction may be extended as far as need requires.

F is a bearing supported in any convenient way, whereby the middle portion of the shaft is upheld. The bearing F is recessed as at $f$, this recess surrounding the shaft A and being connected with an oil pump (not shown) of any usual construction by means of a pipe G so that the recess may be filled with oil and the shaft may run in an oil bath. At each end of the bearing F is an interior annular groove $f^1$ to catch any leakage of oil from the recess $f$. Each of these grooves may be provided with a drip cock $f^2$ or the like so that its contents may drip therefrom or be drawn off from time to time as desired. The recess $f$ is connected by passages $a$ with the passage $A^1$ in the central portion of the shaft. This chamber or passage $A^1$ is closed at each end by a plug $a^1$, the two plugs being preferably held together by means of a screw $a^2$ or otherwise if desired.

The crank pin $B^1$ connects the crank arm $A^2$ and the crank arm $B^2$. As stated above, it is hollow, and its ends are closed by plugs $b^1$ connected by a screw $b^2$ or otherwise. This screw as shown carries a sleeve $b^3$ which has substantially midway between its ends a partition $b^4$ so as to divide the hollow interior of the crank pin B into two chambers $B^3$, $B^4$. The chamber $B^3$ is connected with the chamber $A^1$ by the passage $b$ which passes through the crank arm $A^2$.

Figure 4:
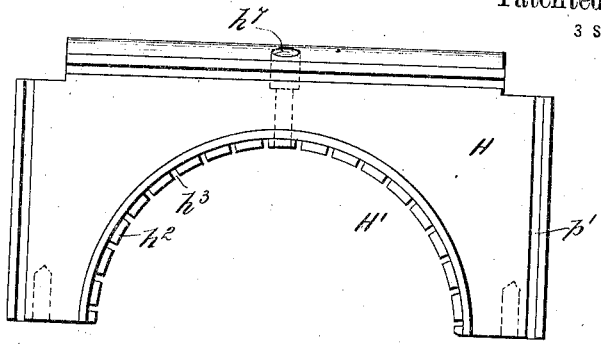
Fig. 4 is an elevation of the bearing in parts.
Figure 5:
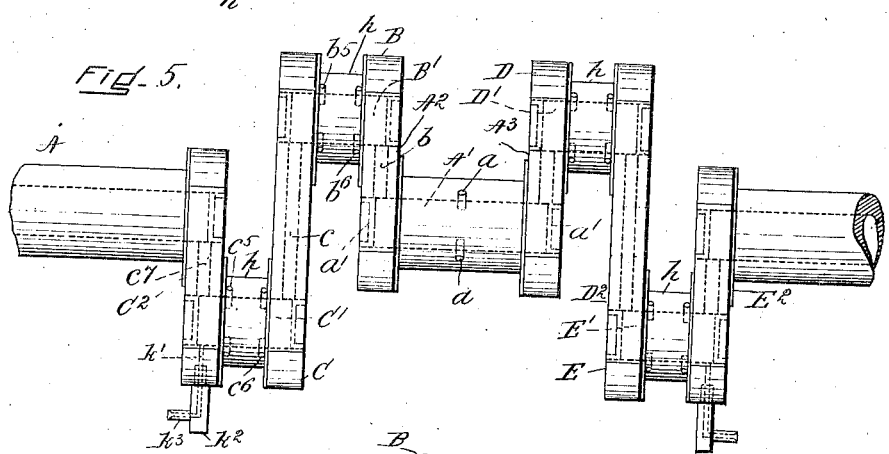
Fig. 5 is an elevation of the crank shaft, the connecting rods and other parts being omitted.
Figure 6:
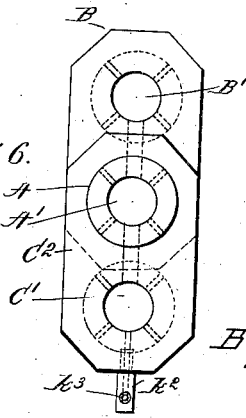
Fig. 6 is an end view of Fig. 5.

The periphery of the crank pin $B^1$ is recessed as at $h$ to receive the box H, which surrounds the crank pin. This box is made in two parts as shown in Fig. 4, each having a semi-cylindrical recess $H^1$, the two parts being alike and being attached together by screws $h^1$. The interior of this recess is ribbed as at $h^2$ to form slots $h^3$ placed fairly close together and serving as passages through which oil may circulate. The ribs do not extend the entire thickness of the box (see Fig. 3). Thus the slots $h^3$ connect chambers $h^4$, $h^5$ at the ends of the interior of the box.

The chambers $B^3$, $B^4$ are connected with the periphery of the crank pin $B^1$ and hence with the interior of the box by passages $b^5$, $b^6$, respectively.

The box serves as a bearing for a connecting rod J. The connecting rod is provided with straps $J^4$, the ends of which are bolted together by bolts $J^5$. These straps surround the box H and in engagement with the box are removable metal shoes $J^6$ which take up the wear on the box. They are held in place by dowel pins $J^7$. The upper and lower edges of the box are curved as at $H^2$ to allow a certain flexibility of movement between the box and the connecting rod.

The connecting rod J carries two tubes $j$, $j^1$, each screwing into a threaded opening $h^6$, $h^7$ in the adjacent edge of the box, the openings connecting with the chambers $h^4$, $h^5$. These tubes connect with a similar box and mechanism at the farther end of the connecting rod. As the construction at the farther end of the connecting rod is identical with the construction above described and shown in the drawings, and as the connecting rods are alike it is not deemed necessary to refer to them further.

The chamber $h^5$ is connected with the chamber $B^4$ through the slots $h^3$ which allow the passage of the oil or lubricant to the passages $b^6$, and the chamber $B^4$.

From the chamber $B^4$ there extends a passage $c$ through the crank arm $B^2$ into the hollow crank pin $C^1$. This crank pin has a passage in all respects like the passage in the crank pin B, that is, it is plugged at each end by plugs $c^1$, which plugs are preferably held in place by the screw $c^2$ carrying the sleeve $c^3$ having the partition $c^4$ dividing the passage into two chambers $C^3$, $C^4$. The chamber $C^3$ is connected as before by the passages $c^5$ with a box H so that the oil passes from the chamber $C^3$ and into the slots $h^3$ in the box H from whence it circulates through the tubes $j^2$, corresponding bearings at the farther end of the connecting rod $J^3$, returning through the tube $j^3$ and by passages $c^6$ into the chamber $C^4$ from which it may pass through the passage $c^7$ in the crank arm $C^2$ to a continuation of the system like that above described. It is indicated, however, to show that the system may be continued to any reasonable extent.

The construction of the cranks D, E is in all respects like the construction of the cranks C, B, and therefore need not be described in detail, these cranks as well as the cranks C and B being supplied with oil from the chamber $A^1$, the oil passing through the various passages and returning in like manner from the passage $A^1$ to the suction or inlet end of the pump to be used over again as occasion may require.

To receive and dispose of the oil which has passed through the bearings and convey it to cooling means and back to the pump before being again circulated through the bearings, I prefer to provide collecting rings K, $K^1$, which are suitably supported concentrically with the shaft A at each end of the crank mechanism as shown in Fig. 1. These rings are alike and are rectangular in cross section, the wall $k$ facing the crank mechanism being slotted or formed in two parts as shown to allow the entrance into the chamber within the ring of a nozzle forming the continuation of the passage $k^1$ in the crank pins C and E. As shown these nozzles are each comprised of two parts, one a part $k^2$ screwing into the crank pin C or E, and the other $k^3$ screwing into the part $k^2$ at right angles thereto and extending into the chamber within the ring. This chamber is divided by a number of partitions $k^4$ so that the oil flowing into it from the rapidly rotating nozzle $k^3$ is separated into a number of bodies or streams and has no opportunity of swashing around, being caught by the partitions and forming films thereon which collect at the bottom of the ring and flow out through the pipe $K^2$. The pipe $K^2$ leads the oil off from the ring K to a cooling tank (not shown) from which it may be pumped back into the bearings, or it may be led directly to the intake of the pump.

To prevent the oil leaking out from the chambers $h^4$, $h^5$ or being driven out by centrifugal force the annular spaces $p$, are filled with packing as shown held in place in grooves $p^1$ by retaining rings $r$ set into the grooves $r^1$.

As a further precaution and improvement, it will be noted that the exit nozzles $k^3$ extend farther away from the axis of the rotating shaft than do the crank bearings H. On this account the centrifugal force is greater at the nozzles $k^3$ than at the crank bearings H, and consequently the oil pressure at H is less than at $k^3$ and there is a suction tending to draw the oil from H to $k^3$.

For this reason in place of the oil at H tending to be thrown out or leak out of the bearing past the packing space $p$, there will be a suction at H and if a packing is defective a small amount of air will tend to be drawn in in place of the oil flying out.

It will be seen that by supplying a constant and sufficient stream of oil to the inlet, say ten gallons per minute, according to the amount of lubrication required, all parts of the crank shaft will be fully and thoroughly lubricated and cooled and there being no leakage there will be practically no waste of oil, and the oil passing out and back to the pump may be given ample opportunity to cool. The tank may be large enough to hold quite an excess of oil and the pump should be ample in power to cause a fairly rapid passage of oil through the system.

I have described above what seems to me the best and simplest way of carrying out my invention, but it will be evident that other ways may be devised.

I was led to make this invention through making some new discoveries with relation to lubrication. Heretofore in all books on the theory of lubrication it has been stated that a bearing broke down and seized when the pressure on the bearing became so great and the oil so fluid from heating that the shaft was forced down on the bearing and rubbing occurred between metal and metal. Not being satisfied with this theory I tabulated all published tests of bearings which I could obtain, according to kind of oil, amount of frictional resistance per square inch, etc.

On making this tabulation I discovered certain empirical laws connecting the different tests and from them was led to the discovery that in ordinary bearings the heat is generated inside the oil film and is transmitted from the oil to the metal of the bearings and from thence to the air, substantially little of the heat being carried off by the oil leaking out through the bearing.

I next determined the co-efficient of the thermal contact resistance between oil and metal, analogous to the electrical contact resistance between metal and metal. This thermal contact resistance represents the amount of heat, or number of calories passing through an oiled metal surface, i. e., from oil to metal per centimeter per second, per degree of difference of temperature.

I found this co-efficient of thermal resistance to be quite high, of the order of say 1000 times as great as the thermal resistance of an equal length of metal.

I then calculated from the value which I determined for this co-efficient the temperature to which the oil film must have been raised in order to pass the observed amount of heat from oil film to metal, for in the tests which I had made and tabulated I further discovered that in each case whether the speed was low and the pressure high, or the speed high and the pressure low, or both intermediate, this temperature was that at which the oil volatilized or turned to a gas.

It therefore became apparent to me that the real cause for the seizing of bearings was, that when the frictional heat generated became so great that it could not be transmitted without the temperature drop across the oil metal contact becoming greater than the volatilizing or decomposing point of the oil, the oil decomposed or volatilized and bubbles of vapor or gas formed and being unable to support the pressure let the shaft come in contact with the bearing whereupon metal to metal friction resulted with the accompanying heat and seizing. I then invented the method above described in which instead of carrying off the heat across the oil metal contact, parallel streams of oil entered at one end of the bearing and the oil in each stream was carried across a narrow strip of bearing surface and thence by the adjacent channel immediately is lead out of the bearing carrying substantially all of its heat with it instead of transmitting it across the oil metal contact, the heat carried away in the oil being later taken out in a separate cooling chamber as above described.

What I claim as my invention is:

1. The method of reducing the friction between surfaces bearing upon and moving relatively to each other which consists in forming a series of channels in one of the bearing surfaces at an angle to the direction of motion, causing a stream of oil to enter at one end of each of said channels, then to cross the strip of bearing surface between each channel and the next adjacent channel, and then to be carried off and out of the end of the next adjacent channel.

2. The method of reducing the friction between surfaces bearing upon and moving relatively to each other which consists in introducing a lubricating fluid between the bearing surfaces at one point, conveying said lubricating fluid by a predetermined path to a point of exit from the bearing surfaces, and so arranging the predetermined path of the lubricating fluid between the bearing surfaces that the travel in a direction parallel to that of the relative motion of the bearing surfaces is less than the travel in the direction perpendicular to the motion of said surfaces, whereby substantially all the frictional heat is carried off in the lubricant instead of being mainly radiated from the bearing surfaces.

3. In a bearing surface lubricating system, the combination of a number of closely adjacent lubricant carrying channels in one of the bearing surfaces, said channels being at an angle to the direction of relative motion of the bearing surfaces, and a chamber connecting the entrance ends of the channels to each other and a chamber connecting the exit ends of the channels to each other.

4. In a crank lubricating system, a moving member, a bearing therefor, said bearing member and said moving member having a recess between them, said moving member being hollow to form a chamber closed at the ends and having passages whereby its hollow interior is connected to said recess, said recess having an inlet, a second hollow moving member closed at its ends and a bearing for said second member, said parts being provided with a recess between them, the interior of said second hollow member being divided into chambers, means connecting both of said chambers with said recess, and means for connecting one of said chambers with the interior of said first named moving member.

5. In a crank lubricating system, a hollow shaft closed at its ends, a bearing therefor, said shaft and said bearing being constructed to have a recess between them, one or more passages connecting the interior of said shaft with said recess, a crank arm having a passage therethrough, a hollow crank pin closed at its ends, means dividing the interior of said crank pin into two chambers, a bearing surrounding said crank pin, said bearing being constructed with relation to said crank pin whereby there will be a chamber adapted for lubricant circulation between them, a passage connecting said bearing chamber with the second chamber in said crank pin, and an outlet to said chamber, and means for causing the circulation of a lubricant through said chambers and passages and out through said outlet.

6. In a crank lubricating system, a hollow shaft closed at each end to form a chamber therein, a bearing therefor, said shaft and said bearing being constructed to have a recess between them, one or more passages connecting the interior of said shaft with said recess, a crank arm having a passage therethrough, a hollow crank pin closed at each end to form a chamber therein, means dividing the interior of said crank pin into two chambers, a bearing surrounding said crank pin, said bearing being constructed with relation to said crank pin whereby there will be a chamber between them, a passage connecting said bearing chamber with the second chamber in said crank pin, and an outlet to said chamber, and a connecting rod mounted on said last named bearing and having passages connected with themselves and with the chamber about said bearing whereby the lubricant may circulate outwardly from said bearing by one passage and return through the other, and means for causing the circulation of a lubricant through said chambers and passages and out through said outlet.

7. In a crank shaft lubricating system, in combination with means whereby a lubricant is circulated through the system, and a rotatory delivery nozzle forming the end of said circulating means, a collecting ring having an outlet and a circular opening concentric with the path of rotation of said nozzle, and located whereby the delivery end of said nozzle will enter into and move within it and discharge the exhaust lubricant into said ring.

8. In a crank shaft lubricating system, comprising hollow shafts and a hollow crank arm, in combination with means whereby a lubricant is circulated through said system, and a rotatory delivery nozzle, a collecting ring having an outlet and a circular opening concentric with the path of rotation of said nozzle, and located whereby the delivery end of said nozzle will enter into and move within said opening and discharge the exhaust lubricant into said ring, said ring being substantially rectangular in cross section, whereby the splashing of the lubricant from said ring on its delivery thereto by said nozzle will be prevented.

9. In a crank shaft lubricating system comprising hollow shafts and a hollow crank arm, in combination with means whereby a lubricant is circulated through the system, and a rotary delivery nozzle, a collecting ring having an outlet and a circular opening concentric with the path of rotation of said nozzle, and located whereby the delivery end of said nozzle will enter into and move within said opening and discharge the exhaust lubricant into said ring, said ring being substantially rectangular in cross section, and having a series of annular plates within it, whereby the splashing of the lubricant from said ring on its delivery thereto by said nozzle will be prevented.

10. That method of caring for the frictional heat between two parts, one of said parts being rotatory, which consists in forcing streams of oil between the moving parts and causing its discharge through a rotatory aperture having a greater radius of movement than said rotatory part whereby centrifugal force will assist by suction in causing the movement of the lubricant through said bearings and in its discharge therefrom.

11. That method of lubricating two members substantially in contact and movable with relation to each other, which consists in passing a stream of lubricant between said members at their points of contact, said stream being sufficient in quantity and rapidity of movement to absorb and carry away the heat developed by the frictional contact of said members.

12. That method of lubricating two members in substantial contact and movable the one on the other, which consists in circulating a stream of lubricant between said members at their points of contact, said stream being under pressure whereby it will be kept constantly moving, said lubricant being sufficient in quantity to absorb and carry away the heat developed by the frictional contact of said members.

13. That method of lubricating two rotatable members in substantial contact and movable the one with the other, which consists in circulating a stream of oil between said members at their points of contact, said stream being fed to said members under pressure and being withdrawn therefrom by centrifugal force due to the rotation of said members and being sufficient in quantity to absorb and carry away the heat developed by the frictional contact of said members, whereby said oil will be heated by friction, cooling said oil and again circulating it between said members.

14. That method of caring for the frictional heat between two parts, one of said parts being rotary, which consists in maintaining said moving parts in a lubricating bath, fed under pressure, and causing the discharge of said lubricant through a rotary aperture having a greater radius of movement than said rotary part whereby centrifugal force will assist by suction in causing the movement of the lubricant through said bearing, and its discharge therefrom and will prevent leakage due to faulty construction.

15. That method of caring for the frictional heat between two parts, one of said parts being rotary, which consists in forcing streams of lubricant between the moving parts and causing the discharge of said lubricant through a rotary aperture having a greater radius of movement than said rotary part whereby centrifugal force will assist by suction in causing the movement of the lubricant through said bearing, and its discharge therefrom, and will prevent leakage due to faulty construction.

REGINALD A. FESSENDEN.